United States Patent [19]
Garbo

[11] 3,840,344
[45] Oct. 8, 1974

[54] CARBON BLACK PRODUCTION
[75] Inventor: Paul W. Garbo, Freeport, N.Y.
[73] Assignee: Chemothermic Industries, Inc., Freeport, N.Y.
[22] Filed: June 6, 1972
[21] Appl. No.: 260,102

[52] U.S. Cl..................... 23/259.5, 423/450, 431/7
[51] Int. Cl....................... C01b 31/02, C09c 1/48
[58] Field of Search .......... 423/450, 455, 456, 457, 423/458; 23/259.5; 431/7, 326, 328, 170

[56] References Cited
UNITED STATES PATENTS

| | | | |
|---|---|---|---|
| 2,436,282 | 2/1948 | Bennett.............................. | 423/450 |
| 2,600,994 | 6/1952 | Krejci ................................ | 23/259.5 |
| 2,618,533 | 11/1952 | Bills et al........................... | 423/458 |
| 2,828,813 | 4/1958 | Holden ........................ | 431/328 X |
| 3,009,783 | 11/1961 | Sheer et al..................... | 23/259.5 X |
| 3,179,156 | 4/1965 | Weiss et al.......................... | 431/329 |
| 3,383,159 | 5/1968 | Smith..................................... | 431/7 |

Primary Examiner—Oscar R. Vertiz
Assistant Examiner—Hoke S. Miller
Attorney, Agent, or Firm—Paul W. Garbo

[57] ABSTRACT

Carbon black is produced by pyrolysis of a hydrocarbon feedstock in a furnace having porous walls through which gaseous fuel and oxygen-containing gas are introduced into the furnace to produce hot combustion gases into which the feedstock is dispersed for thermal decomposition to carbon black. The porous walls have several advantages such as prevention of carbon deposition, greater uniformity of temperature, less damage to the walls and diminished heat loss from the furnace. Great flexibility of operation is made possible by the porous walls so that a wide variety of carbon black grades can be produced.

4 Claims, 2 Drawing Figures

PATENTED OCT 8 1974
3,840,344
FIG. 1
FIG. 2
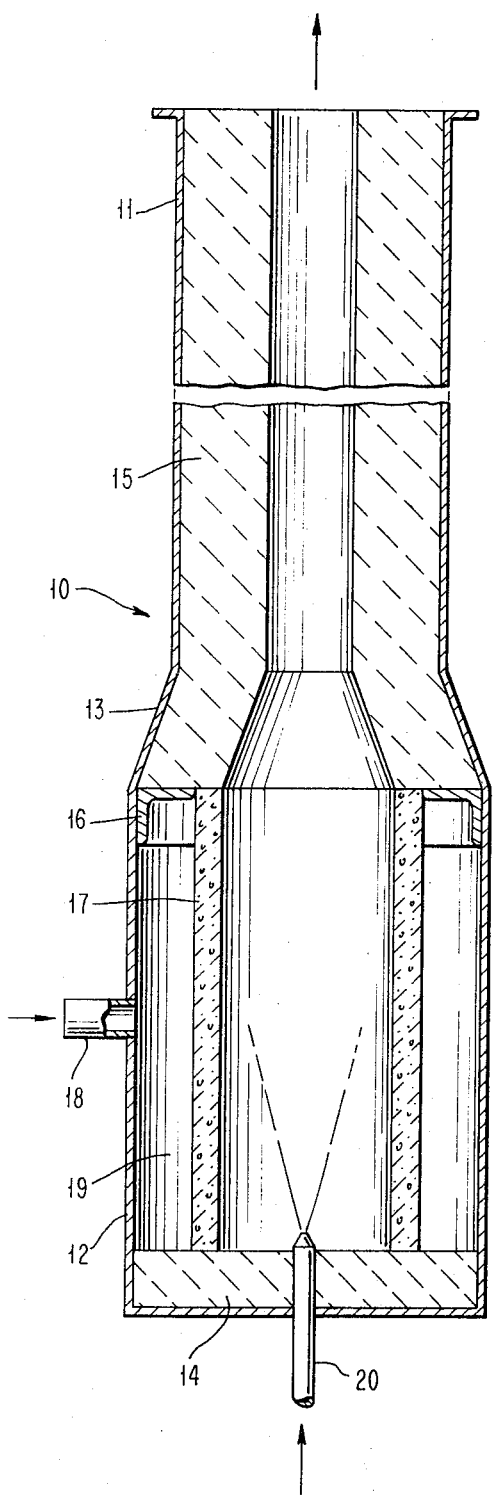
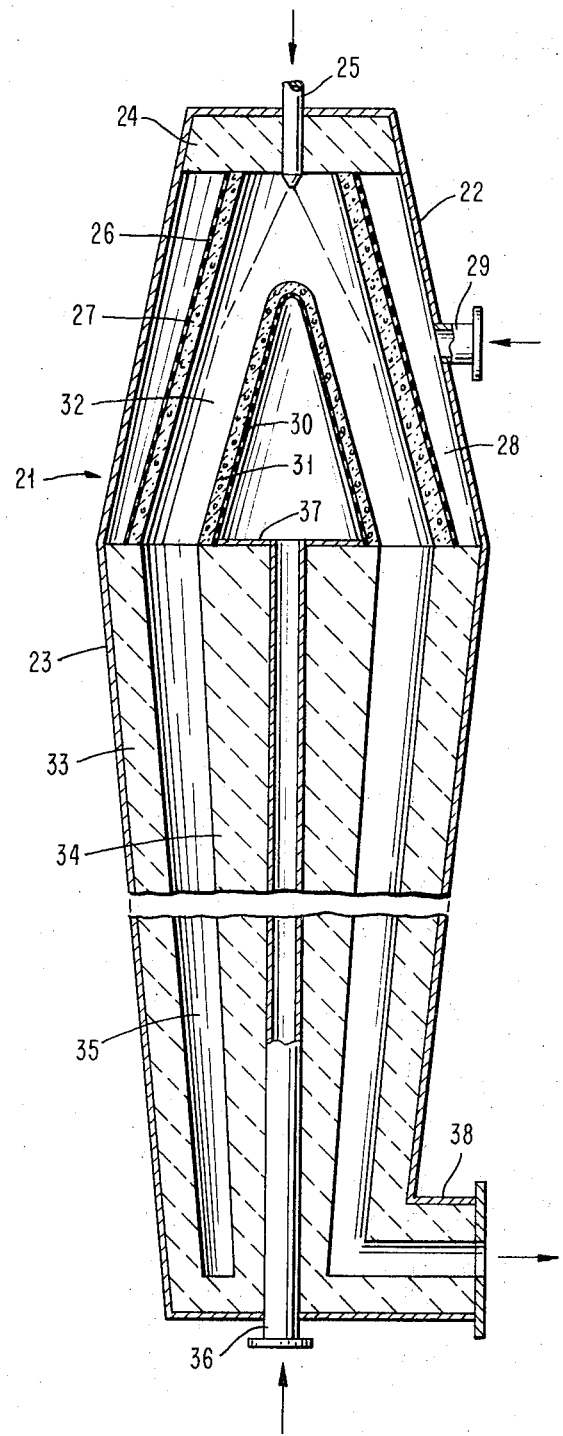

CARBON BLACK PRODUCTION

BACKGROUND OF THE INVENTION

It has been reported that more than 90 percent of all carbon black made in the world today is manufactured by the oil furnace process. Numerous variations of the oil furnace process have been developed or proposed and many of these variations involve a swirling blast or spiraling mass of hot combustion gases into which a hydrocarbon feed stock is injected and dispersed. U.S. Pat. No. 3,490,869 to Heller further discusses such prior art and is illustrative of the specially designed furnaces required to produce the spiraling mass of hot gases in which the feedstock is dispersed and decomposed to carbon black.

On the other hand, U.S. Pat. No. 3,490,870 to DeLand discusses variations of the furnace process not involving the spiraling mass of hot combustion gases and points out several difficulties or limitations encountered in such adaptations of the furnace process. DeLand proposes to improve the furnace process by injecting the feedstock into one localized portion of hot combustion gases while a second portion of hot gases is passed around the first-mentioned portion. Besides requiring two sets of ducts carefully distributed around the injection point for the feedstock and controls for each set of ducts, DeLand even discloses a set of tertiary ducts for supplying combustion gases to provide a spiraling motion to the atmosphere within the furnace.

A principal object of this invention is to provide an improved apparatus and process for producing carbon black from a hydrocarbon feedstock.

SUMMARY OF THE INVENTION

In accordance with this invention, a hydrocarbon feedstock is injected into hot combustion gases burning contiguous to porous walls from which a mixture of gaseous fuel, such as normally gaseous and vaporized hydrocarbons, and free oxygen-containing gas emanates to burn and form the hot combustion gases. Thus, the atmosphere of hot gases, generally at a temperature in the range of about 2,000° to 2,800°F., into which the feedstock is dispersed is surrounded by uniformly radiant surfaces that are kept clean of carbon deposition by the flow of the gases emanating from the porous walls as well as by surface combustion.

While the porous walls for the purposes of this invention may be any refractory material through which gases readily pass under a positive pressure, such as fused alumina or felted fibrous zirconia, it is preferred to use porous walls formed in accordance with the teachings of U.S. Pat. No. 3,179,156 to Weiss et al., for producing a fibrous porous wall deposited upon a screen. The molding of such a fibrous porous wall is described in detail in the Weiss et al., patent in connection with FIGS. 4 and 5 thereof. Improvement of such fibrous porous walls is disclosed in U.S. Pat. No. 3,383,159 to Smith. It is significant for the purposes of this invention that ceramic fibers capable of withstanding very high temperatures have become commercially available since the grant of the Weiss et al and Smith patents. For instance, Fiberfrax, an alumina-silica fiber made by the Carborundum Company, is now produced in a grade suitable for use at temperatures up to 2,600°F. Also, Union Carbide Corporation produces a very refractory fiber of zirconia which is well suited for forming the fibrous porous walls used in the preferred embodiment of this invention.

BRIEF DESCRIPTION OF THE DRAWINGS

Further clarification of the invention will become evident from the description presented hereinafter in connection with the accompanying drawings of which:

FIG. 1 is a more or less diagrammatic sectional elevation of one form of the furnace of this invention; and FIG. 2 is a similar view of another embodiment of the furnace of the invention.

DESCRIPTION OF PREFERRED EMBODIMENTS

Referring to FIG. 1, the furnace for producing carbon black comprises a cylindrical steel vessel 10 in which the upper section 11 is of smaller diameter than that of lower section 12, these two sections being connected by a tapering or frusto-conical section 13. A refractory slab 14 rests on the base of vessel 10 and a refractory liner 15 is disposed within sections 11 and 13 of vessel 10. Steel angle 16 attached inside vessel 10 to the top end of lower section 12 provides support for liner 15.

A porous refractory wall 17 in the form of a cylinder is concentrically positioned within lower section 12 of vessel 10 and extends from slab 14 to liner 15. An inlet opening 18 in lower section 12 communicates with the annular space 19 between section 12 and porous wall 17. An injector 20 for supplying a hydrocarbon feedstock extends through the bottom of vessel 10 and slab 14 and is aligned with the axis of porous cylindrical wall 17. Porous wall 17 may be formed of fused alumina but preferably is a layer of ceramic fibers bonded together by an inorganic refractory compound and supported by a metal screen on the outside of cylindrical wall 17. The molding of such a porous fibrous layer on a supporting screen is taught by the aforesaid patents of Weiss et al and Smith.

In the operation of the furnace of FIG. 1, air and gaseous fuel such as methane are admixed generally in a ratio of air to methane exceeding 10 to 1 and are introduced through inlet opening 18 into annular space 19. Thence, the combustible mixture passes through porous cylindrical wall 17 and immediately burns to form a mass of hot combustion gases. Particularly, when porous wall 17 is a molded layer of ceramic fibers, flameless surface combustion takes place on the inside surface of cylindrical wall 17. A feature of the invention is that all of the inside surface of porous wall 17 is maintained in a substantially uniformly radiant condition by the combustible mixture emanating thereat. Moreover, the combustible mixture passing inwardly through porous wall 17 counteracts the tendency of heat to flow outwardly through wall 17. Thus, the combustible mixture is pre-heated before undergoing surface combustion, overheating and damage of wall 17 are avoided, and outward heat losses from the combustion zone surrounded by porous wall 17 are greatly minimized.

The hydrocarbon feedstock, preferably a highly unsaturated residue rich in aromatics and obtained from petroleum cracking operations, is atomized through injector 20 into the mass of hot combustion gases contained by inwardly radiant porous wall 17. The thermal decomposition of the finely dispersed petroleum residue to carbon black is promptly initiated in the combustion zone surrounded by porous wall 17 and is completed while the mass of hot combustion gases flows up through the reaction zone surrounded by refractory liner 15. The hot gases carrying the thus produced carbon black in suspension discharge from the top of vessel 10 into a suitable duct (not shown) leading to conventional quenching apparatus and collection system for separating the carbon black from the gases.

The furnace of FIG. 2 has a steel shell 21 formed of two frusto-conical sections 22 and 23 joined at their largest diameters. Inside the top of upper section 22 is a refractory slab 24 and an injector 25 for a hydrocarbon feedstock extends through the center of the top of shell 21 and slab 24. A frusto-conical metal screen 26 with a layer 27 of ceramic fibers molded on the inner side of screen 26 is disposed concentrically within upper section 22 of shell 21 to form an annular space 28 between screen 26 and shell 21. An inlet opening 29 in upper section 22 permits the introduction of air and fuel gas into annular space 28. The combustible gas mixture filling annular space 28 permeates uniformly through porous layer 27 and undergoes flameless surface combustion on the face of layer 27 which is not in contact with screen 26.

A conical screen 30 with a molded layer 31 of ceramic fibers on its outer side is positioned concentrically within frustoconical screen 26 so as to form a hollow conical space 32 bounded on its outside by porous refractory layer 27 and on its inside by porous refractory layer 31. Injector 25 is of the type that sprays the feedstock in the form of a hollow cone substantially coinciding with hollow conical space 32.

Lower section 23 of shell 21 has a refractory liner 33 and a central refractory column or core 34 uniformly spaced from liner 33 to provide an annular space 35 therebetween which tapers inwardly from the top to the bottom of section 23. A pipe 36 extends through the bottom of steel shell 21 and up the center of refractory column 34. A circular steel disk 37 rests on the top of column 34 and has its periphery spot welded to the bottom edge of conical metal screen 30. The top end of pipe 36 is welded to a central opening in disk 37. Thus, a combustible gas mixture passed up through pipe 36 fills the conical space within screen 30 and permeates uniformly through porous layer 31 on the outer surface of which it undergoes flameless surface combustion. The bottom of lower section 23 has a lateral opening 38 through which all of the hot combustion gases carrying in suspension the carbon black produced in the furnace flow to known quenching apparatus and collectors for separating the carbon black from the gases.

In the operation of the furnace of FIG. 2, a mixture of air and a hydrocarbon gas is supplied to annular space 28 through inlet opening 29 and the same or a different combustible gas mixture is introduced through pipe 36 into the conical space within screen 30. The combustible gas mixture emanating at the free face of each of porous layers 27 and 31 is ignited in hollow conical space 32 by any known means such as a pilot flame or a sparking device. The opposed free faces of porous layers 27 and 31 immediately become radiant and all of the combustible gas mixture supplied to each of layers 27 and 31 undergoes flameless surface combustion on the free face of the respective layer. Thus, hollow conical space 32 into which the feedstock is dispersed by the injector 25 is maintained at a uniformly high temperature promoting rapid pyrolysis of the feedstock to carbon black.

The types of hydrocarbon feedstocks, whether gaseous or liquid, the fuel gases and air or oxygen-containing gas used to produce the hot combustion gases in which the feedstock is thermally decomposed to carbon black, the desired pyrolysis temperatures for the various grades of carbon black and how such temperatures are obtained by varying the ratio of oxygen to fuel in any combustible gas mixture as well as the residence time of the reactants in the furnace and other operational details are well known in the art of producing carbon black.

The porous refractory walls used in the furnace of this invention make it possible to maintain an unusually uniform high temperature which is readily and simply controlled by the molar ratio of oxygen to fuel in the combustible gas mixture and the flow rate of the gas mixture through the porous walls. The desired high temperature is also more readily attained with the porous walls when the oxygen in the combustible gas mixture is supplied as an oxygen-enriched fraction of air. With such control, the structure of the carbon black produced can be varied considerably to satisfy the requirements of different end uses of carbon black.

Many variations and modifications of the invention will be apparent to those skilled in the art without departing from the spirit or scope of the invention. For instance, while the feedstock is sprayed in a generally conical pattern in the furnaces of FIGS. 1 and 2, the feedstock may be sprayed in a substantially flat fan pattern between two flat porous refractory walls disposed with their radiant surfaces facing one another. If the feedstock is a hydrocarbon gas or vapor, it may be advantageous to introduce it into the furnace of this invention through a porous refractory wall, either alone or admixed with some oxygen-containing gas. Thus, in the furnace of FIG. 2, injector 25 could be shut off and a feedstock vapor such as propane or butane could be uniformly introduced into hollow conical space 32 by way of pipe 36 and porous refractory layer 31. In such case, all of the heat required for the pyrolysis of the feedstock vapor to produce carbon black could be supplied by radiant porous layer 27 although some air, alone or mixed with gaseous fuel such as methane, might be supplied to porous layer 31 in admixture with the feedstock vapor so as to provide supplemental heat. Accordingly, only such limitations should be imposed on the invention as are set forth in the appended claims.

What is claimed is:

1. A furnace for producing carbon black by thermal decomposition of a petroleum residue comprising:

a. a combustion section into which a first combustible mixture of free oxygen-containing gas and gaseous fuel is supplied through a first porous refractory wall of said combustion section and into which a second combustible mixture of free oxygen-containing gas and gaseous fuel is supplied through a second separate porous refractory wall of said combustion section, both of said porous refractory walls being positioned in spaced facing relation to one another and adapted for flameless surface combustion on the face thereof from which one of said combustible mixtures emanates;

b. spraying means for dispersing said petroleum residue into said combustion section in proximity to both of said porous refractory walls; and
c. a refractory lined section communicating with said combustion section for passage therethrough of the gaseous effluent from said combustion section so that said thermal decomposition of said petroleum residue initiated in said combustion section is substantially completed before said gaseous effluent discharges from said refractory lined section.

2. The furnace of claim 1 wherein each of the two separate porous refractory walls is a layer of ceramic fibers molded on a metal screen.

3. The furnace of claim 1 wherein one of the two separate porous refractory walls is in a conical form and the other of said two walls is in a frusto-conical form within which said conical form is positioned.

4. The furnace of claim 3 wherein each of the two separate porous refractory walls is a layer of ceramic fibers molded on a metal screen.

* * * * *